United States Patent [19]

Kawamura

[11] Patent Number: 4,849,003
[45] Date of Patent: Jul. 18, 1989

[54] GLASS-MADE LID FOR A COOKING PAN AND THE LIKE AND A METHOD OF MANUFACTURE THEREOF

[75] Inventor: Morio Kawamura, Nagoya, Japan

[73] Assignee: Kawamura Glass Manufacturing Co., Ltd., Aichi, Japan

[21] Appl. No.: 203,877

[22] Filed: Jun. 7, 1988

[30] Foreign Application Priority Data

Jun. 18, 1987 [JP] Japan .................... 62-152361

[51] Int. Cl.⁴ .......................... C03B 23/023
[52] U.S. Cl. ........................ 65/106; 65/104; 65/268; 65/275; 220/82 R; 220/356; 220/377
[58] Field of Search ............. 65/102, 104, 106, 268, 65/272, 275; 220/82 R, 356, 377

[56] References Cited

U.S. PATENT DOCUMENTS

| 293,035 | 2/1884 | Jones | 220/377 X |
|---|---|---|---|
| 2,950,569 | 8/1960 | Chapman | 65/106 X |
| 4,053,295 | 10/1977 | Miyauchi | 65/104 X |
| 4,260,405 | 4/1981 | Ambrogi | 65/42 |

FOREIGN PATENT DOCUMENTS

| 0173418 | 3/1986 | European Pat. Off. |
| 1596486 | 5/1970 | Fed. Rep. of Germany . |
| 1568724 | 5/1969 | France . |
| 2459786 | 1/1981 | France . |
| 1058615 | 3/1986 | Japan | 220/377 |
| 329305 | 6/1958 | Switzerland | 65/106 |

Primary Examiner—Arthur Kellogg
Attorney, Agent, or Firm—Wenderoth, Lind & Ponack

[57] ABSTRACT

A glass-made lid for a cooking pot, pan, and the like and a method of manufacture thereof are disclosed, wherein the glass-made lid includes a peripheral edge of a particular shape formed from a roundly-cut sheet glass by rotating either the sheet glass or a thermally-resistant forming roller to the other and the method provides such a glass-made lid having the features described above. For the purpose of the invention, the forming roller is provided adjacent to the sheet glass and includes a peripheral recess on the side facing the sheet glass so that the peripheral edge in its softened state can be formed to conform to the particular shape of the peripheral recess under the pressure of the forming roller when it is brought closer to the sheet glass. An additional thermally-resistant nipping roller includes two rolls for engaging the formed peripheral edge therebetween and reforming it to a particular shape. Finally, the formed sheet glass is formed by any applied heating so that it can have a curved surface.

6 Claims, 2 Drawing Sheets

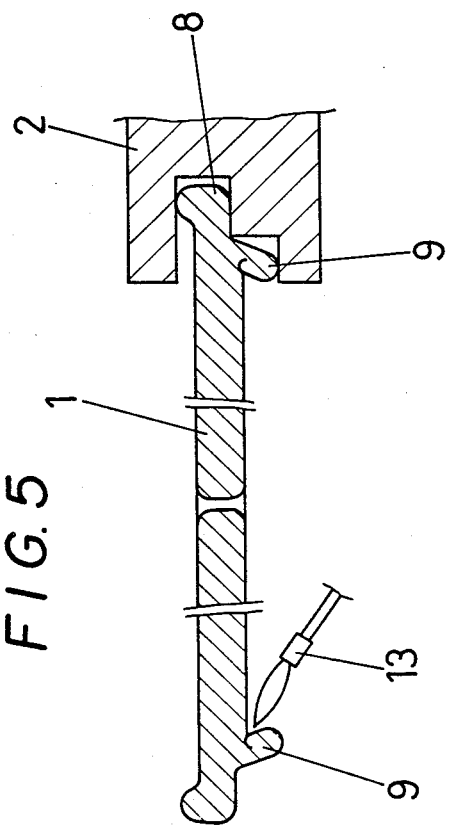
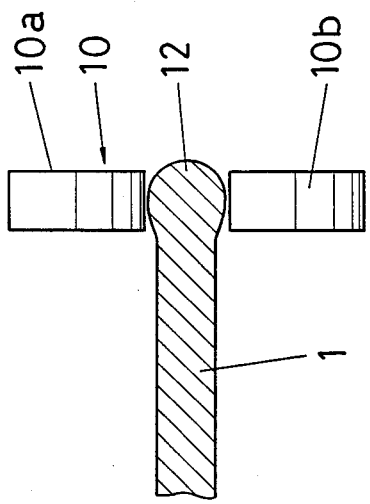
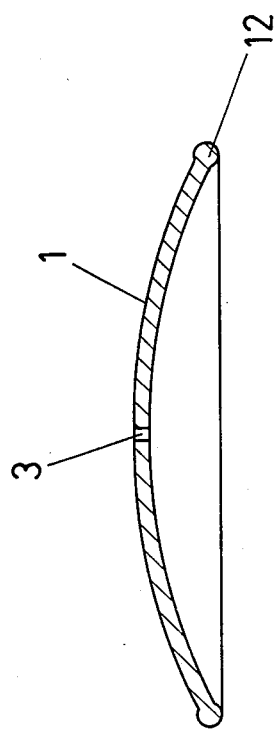
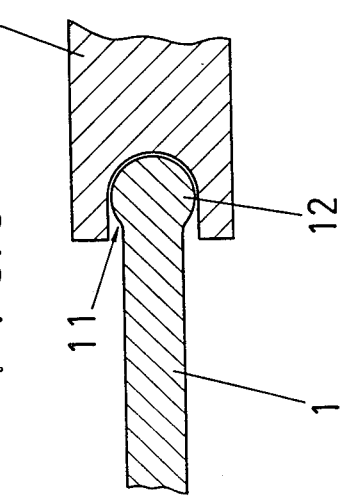

GLASS-MADE LID FOR A COOKING PAN AND THE LIKE AND A METHOD OF MANUFACTURE THEREOF

BACKGROUND OF THE INVENTION

1. Field of the Invention

The present invention relates to a glass-made lid for use with a cooking pan, pot, and the like, and a method of manufacture thereof. The glass-made lid allows the user to check to see how the cooking is occurring.

2. Description of the Prior Art

When a cooking pan, for example, is used for any cooking purpose, the pan is usually covered with its lid during the cooking process. Whenever it is required to check to see how the contents are being cooked, the lid must be removed from the pan. As this is inconvenient, it is desirable that the contents being cooked inside the pan can be monitored from the outside without removing the lid.

In order to meet the above needs, there are already glass-made lids that have been offered in a variety of kinds. For practical uses, those conventional glass-made lids have a different construction:

(1) one lid is made of a round sheet glass base formed to present a curved or bulged surface having its peripheral edge fitted with an annular metal ring;

(2) another lid is made of a metal base formed similarly and having an small see-through glass window mounted usually around its central area; and (3) a third lid is totally made of a molded glass.

The above-listed conventional lids have their own problems including those involved in the process of forming the respective lids and therefore those associated with the products obtained through the respective forming processes. Specifically, the problems may be listed for each of those lids, as follows:

(1) The first-mentioned lid, which is formed to provide a bulged surface having a metal ring mounted around the peripheral edge thereof, may have a good visibilty and may be obtained through a relatively simplified process. However, the presence of the peripheral metal ring has a problem in several respects. As the contents are being boiled inside the pan, part of them, such as soup, may be flooded over, entering the joint between the peripheral edge of the glass base and the metal ring. That portion of the substances which has entered the gap between the two parts cannot be removed by the usual water cleaning, and remains there permanently as dirty solids. This raises a hygienic problem as well as an appearance problem.

(2) The second-mentioned lid, which consists essentially of a formed metal base with a central glass window mounted, provides a narrow scope of sight into the pan. It is apparent that as this limits the sight, it is impossible to see the interior of the entire pan. This construction also has the similar problem as described in the item (1) above, since it allows part of the boiling-over soup to enter the joint where the glass window is mounted, and produces the same hygienic problem.

(3) The last-mentioned lid, whose construction is totally made of an appropriately molded glass, may be advantageous over the first two constructions in that it has no problems as described above. Instead, there is a different problem associated with its forming process, which employs a particular metallic mold. The problem is that the glass lid obtained by molding usually presents irregularities on its surface, and an image may be viewed as distorted when the contents are seen through the lid. Furthermore, the glass material must be molded to a shape that can meet the particular requirements for the shape of a pan on which the lid is to be seated. Specifically, a sheet glass must be molded to the shape having a peripheral edge that exactly and snugly fits the corresponding peripheral edge of the pan when the lid is seated on the pan. Thus, a metallic mold must meet the particular dimensional and shape requirements. This requires a complex mold, which costs highly. Usually, the molding process must be followed by a tempering process so that the molded glass can have more strength. For the practical purposes, however, it is difficult to pass the molded glass through the tempering process, because any kind of lid is not thick enough to sustain the tempering process. Thus, the molded glass is usually finished as a product by bypassing the tempering process. If the tempering process is required so that the molded glass can have the practical strength requirements, it will have to have a greater thickness, which would make the lid heavier and less transparent.

SUMMARY OF THE INVENTION

The present invention has been developed as a result of the careful study of the problems of the above mentioned prior arts. It is therefore a principal object of the present invention to provide a glass-made lid for a kitchen pot, pan, and the like and a method of manufacture thereof. According to the invention, a glass-made lid can be produced at less cost, and the lid thus obtained can have a good transparency and can be kept clean at all times.

The above object may be achieved by the method of the invention, which consists essentially of the following steps:

(1) For a sheet glass which has previously been cut to a round shape for forming a lid, its peripheral edge is heated to between 820° C. nd 840° C. until it becomes soft.

(2) A thermally-resistant forming roller is provided adjacent to the sheet glass which is supported on its axis, and includes a peripheral recess of any particular shape in conformity to which the peripheral edge is to be formed when the forming roller applies its force to the peripheral edge toward the sheet glass. The forming of the peripheral edge is accomplished by either rotating the sheet glass on its supported axis, or causing the forming roller to travel along the stationary sheet glass (for example, at the rate of 12 turns per minute);

(3) A thermally-resistant nipping roller is also provided, which includes two hot-press rolls between which the peripheral edge of the sheet glass is to be sandwiched. Then, one of the two rolls presses the peripheral edge toward the other roller opposite it, thus reforming it to its correct shape from which any warps or other defects have been removed;

(4) The sheet glass is finally formed to provide a curved or bulged surface like an actual lid under the applied heating of 650° C. to 700 ° C.;

(5) Optionally and preferably, the sheet glass may pass through any suitable tempering process so that it can have more mechanical strength.

As described above, the sheet glass is initially heated to allow its peripheral edge to soften evenly. This is prerequisite to the following forming process, which may be done by either rotating the sheet glass on its supporting axis with regard to the stationary forming roller, or causing the forming roller to travel along the peripheral edge of the sheet glass. The peripheral edge in its softened state may be given the particular shape which conforms to the shape of the peripheral recess in the forming roller, by forcing the forming roller to press the peripheral edge toward the center of the sheet glass. The forming roller is provided for free rotation, and can provide the uniform shape to the peripheral edge while rotating with the rotating sheet glass or traveling along the stationary sheet glass. At this stage, the formed peripheral edge of the sheet glass may possibly contain local thick portions that may be caused by the surface tension of the fused glass or the whole sheet glass may contain warps or undulations.

For either case, those problems may be corrected by using the nipping roller. That is, any local thick portions around the peripheral edge or any warps or undulations through the whole sheet glass may be removed by rotating the sheet glass with its peripheral edge sandwiched by the nipping roller.

After those defects have been removed, the sheet glasses passes through any suitable hot-press shaper where it is shaped by heating to provide a curved surface like a lid.

In order to give the sheet glass more strength, the tempering process (such as chemical tempering, water-mist tempering, air-blast tempering, etc.) may optionally be used. Preferably, it should be used.

BRIEF DESCRIPTION OF THE DRAWINGS

Those and other objects, features and advantages of the present invention will become apparent from the detailed description of the preferred embodiments that will follow with reference to the accompanying drawings, in which:

FIGS. 1 through 5 are given to illustrate a first preferred embodiment of the present invention, in which FIG. 1 is a general plan view of a sheet glass cut to a round shape;

FIG. 2 is a partly enlarged section view of a forming roller for use with the method of the invention where the relationship between the sheet glass and forming roller is shown to illustrate how the peripheral edge of the sheet glass is to be formed by the forming roller;

FIG. 3 is a partly enlarged sectional view showing the relationship between the sheet glass and a nipping roller; and FIG. 4 is an overall sectional view of the sheet glass that has been formed through the preceding steps of FIGS. 2 and 3.

FIG. 5 is a partly enlarged sectional view showing how a leg portion of the sheet glass which is to be seated on a pan, pot or the like is to be formed.

FIGS. 6 through 8 illustrate a second preferred embodiment of the present invention, in which FIG. 6 is a partly enlarged sectional view showing the relationship between the forming roller and sheet glass; and FIG. 7 is a partly enlarged sectional view showing the relationship between the nipping roller and sheet glass; and FIG. 8 is an overall sectional view of the sheet glass that has been formed through the preceding steps of FIGS. 6 and 7.

DETAILED DESCRIPTION OF THE PREFERRED EMBODIMENTS

Referring first to FIGS. 1 through 5, a first preferred embodiment of the present invention is described in detail. The description is provided in the order of those figures shown in which the method of the invention is to be performed.

Figure 1:
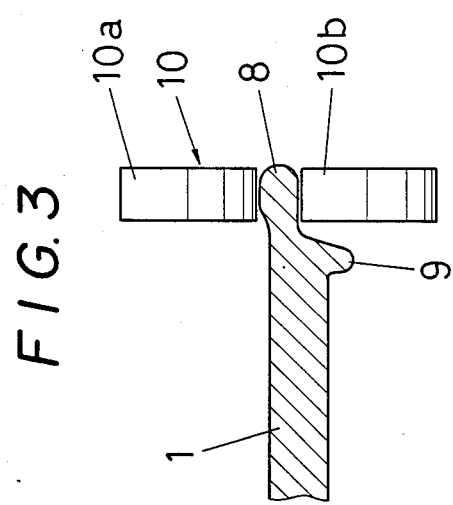

In FIG. 1, a sheet glass 1 and a forming roller 2 are shown schematically from which the relative positions of those two may be seen. The sheet glass 1 is previously cut to any suitable shape, usually a round shape, for forming a lid. It is usually 1 to 10 mm thick, and carries a central aperture 3 into which a knob is to be mounted. Then, the sheet glass is supported on any suitable support so that it can rotate about its own axis acting as a fulcrum. The forming roller 2 is located beside the sheet glass 1 so that it can both turn on its axis and travel along the peripheral edge 4 of the sheet glass, and can also travel closer to and away from the sheet glass. When the forming roller 2 is brought closer to the sheet glass, it can exert a force or pressure on the peripheral edge 4 for forming it to a particular shape. A heater which is not shown is provided for heating the peripheral edge 4 of the sheet glass 1 to about 830° C.

Figure 2:
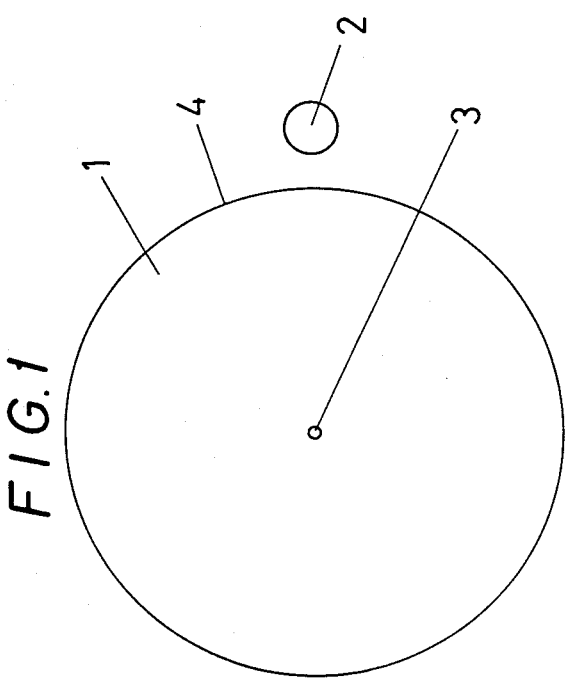

FIG. 2 shows the forming roller 2 in relation to the sheet glass 1. As it may be appreciated from FIG. 2, the sheet glass 1 has its peripheral edge 4 formed to the shape conforming to the particular shape provided by the forming roller 2 when it applies the force or pressure to the peripheral edge 4. In its one preferred form, the forming roller 2 has a first recess 5 and a second recess 6 on its peripheral side facing the sheet glass 1, the first recess 5 extending deeply inwardly and the second recess 6 extending less deeply inwardly. As an initial step, the forming roller 2 is brought closer to the sheet glass 1 until it engages the peripheral edge 4 of the sheet glass 1. Then, an edged portion 7 formed between the first and second recesses 5 and 6 is brought in alignment with the longitudinal center line of the peripheral edge 4 of the sheet glass 1 and is also brought in contact with the peripheral edge 4. When the forming roller 2 gradually travels further toward the sheet glass 1, it applies its force to the sheet glass 1, forming the peripheral edge 4 in its softed state to the shape that conforms to the shape provided by the first and second recesses 5 and 6, that is, the shape including a head portion 8 that is raised upwardly and a leg portion 9 that is depending downwardly. As the forming of the leg portion 9 may occur such that its depending portion includes an inwardly curled part, a burner 13 may be provided to face the inwardly curled side of the leg portion 9 (FIG. 5). the leg portion 9 can be intimately settled on the sheet glass by heating its curled part. After the head portion 8 and depending leg portion 9 are completely formed by rotating either the sheet glass or forming roller relative to the other. The forming roller 2 is brought back away from the sheet glass 1, and then a nipping roller 10 is brought closer to the sheet glass.

Figure 3:
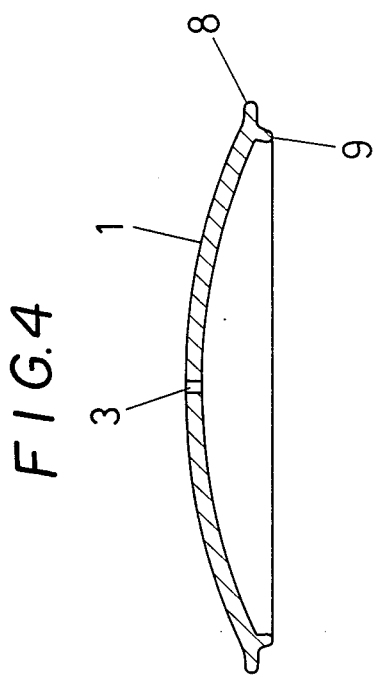

FIG. 3 shows the nipping roller 10 which engages the formed peripheral edge of the sheet glass. As shown, the nipping roller 10 includes a first roll 10a and a second roll 10b, between which the head portion of the peripheral edge of the sheet glass is sandwiched. In this condition, the first roll 10a is gradually pushed down toward the second roll 10b opposite it (or the second roll 10b may be operated similarly), and those two rolls cooperate to remove the raised part of the head portion 8. Thus, the head portion 8 becomes substantially flat, and any warps and/or undulations over the whole sheet glass can be removed. If desired, the nipping roller 10 may be provided with any suitable pattern by engraving or the like. In this way, this pattern may be copied to the peripheral edge of the sheet glass.

The sheet glass 1 whose peripheral edge has been formed and from which any warps, etc. have been removed is then passed through any suitable hot-press shaper (not shown), for example, which provides a curved surface for the sheet glass as a whole. An example of the curve-surfaced sheet glass or lid is shown in FIG. 4.

This sheet glass or lid may further pass through any suitable tempering process. In this case, the tempering process for the usual glass may be employed, whereby the glass is initially heated to a temperature of 700° C., and then is rapidly cooled to 300° C. by water or the like.

Figure 4:
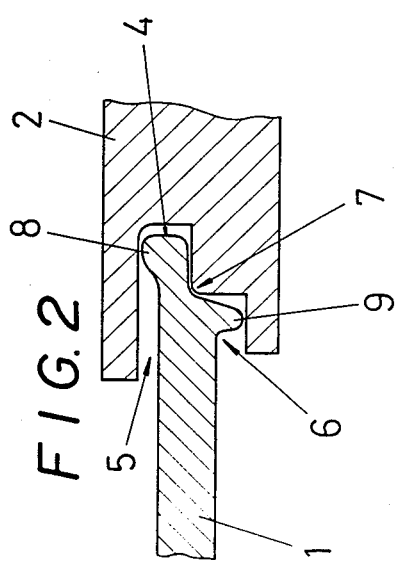

The glass lid thus obtained and shown in FIG. 4 is called the "double type" lid in the relevant industry. When this type of lid is placed on its pan or the like, its leg portion 9 is located inside the pan, and its head portion 8 is seated on the peripheral edge of the pan so that it can cover the whole pan.

A second preferred embodiment of the present invention is shown in FIGS. 6 through 8.

As shown in FIG. 6, a forming roller 2 is varied to include a single recess 11 on its peripheral side facing the sheet glass to be formed. The recess 11 has a substantially roundly-shaped end like a letter of "U" in cross section. Similarly to the preceding embodiment, the forming roller 2 is brought closer to the sheet glass 1 until it engages the peripheral edge 4 in a softened state of the sheet glass 1. Thus, the peripheral edge 4 is formed to provide the shape like a bead conforming to the shape of the recess 11. After the peripheral edge 4 has been formed. the forming roller 2 is removed and then the nipping roller 10 is brought closer to the sheet glass 1 until its first roll 10a and second roll 10b engage the formed peripheral edge 4. Similarly to the preceding embodiment, the first roll 10a is gradually pushed down toward the second roll 10b opposite it, pressing the bead-formed peripheral edge 4 until its upper side becomes slightly flattened, as shown in FIG. 7.

The sheet glass having its peripheral edge formed in the above manner passes through any suitable hot-press shaper, for example, as for the preceding embodiment, where the sheet glass is shaped to provide a curved surface. An example of the thus obtained lid is shown in FIG. 8.

The glass lid obtained through the steps described above is called the "single type" lid in the relevant industry. This type of lid is used with a pan or the like that is provided with a peripheral stepped seat inside it, on which the lid is placed.

Similarly to the preceding embodiment, the formed sheet glass may pass through any suitable tempering process, and may be given more strength under the same conditions as for the preceding case.

For both of the preferred embodiments, either the sheet glass may be rotated on its axis with the stationary forming roller engaging the peripheral edge of the rotating sheet glass as described, or the forming roller may travel around the stationary sheet glass with its peripheral edge engaged by the forming roller.

As it may be appreciated from the foregoing description, the present invention provides the following advantages and merits:

(1) The lid can be completed without using any metal parts. A complete cleaning of the lid is made possible without any dirty solids, such as boiling-over soup, that might otherwise remain on the lid. Thus, this keeps the lid clean without causing any hygienic problem.

(2) The lid is only based on a transparent glass, which provides a good see-through function.

(3) The lid can be obtained simply by forming the sheet glass to the shape of the lid, which makes the lid less costly.

(4) The tempering process can allow a thin sheet glass to be used. Thus, the lighter lid can be obtained.

(5) The forming of the peripheral edge to the particular shape makes that part mechanically strong.

Although the present invention has been described by reference to the specific preferred embodiments, it should be understood that various changes and modifications may be made without departing from the spirit and scope of the invention.

What is claimed is:

1. A method of manufacturing a glass-made lid for a kitchen pan, pot, and the like, comprising the steps of:

providing a sheet glass previously cut to a suitable round shape for forming a glass lid, said sheet glass including a peripheral edge to be formed to a particular shape and being supported on its axis, and providing thermally-resistant forming roller means adjacent to said sheet glass, said forming roller means including a peripheral recess of said particular shape on the side facing said sheet glass;

heating said peripheral edge of said sheet glass to any required softening temperature and thereby allowing the same to soften;

engaging said peripheral recess of said forming roller means with said peripheral edge in its softened state of said glass sheet and causing the relative rotary motion of said sheet glass and said forming roller means with regard to each other, thereby forming said peripheral edge of said sheet glass to conform to said particular shape of said peripheral recess of said forming roller means by forcing said forming roller means to press said peripheral edge toward said sheet glass:

engaging thermally-resistant dual-roll nipping roller means with said formed peripheral edge of said sheet glass, and forcing one of the two rolls of said nipping roller means to press said formed peripheral edge of said glass sheet between said two rolls in the direction of the width of said peripheral edge; and forming said sheet glass to a curved-surface by heating and shaping the same.

2. A method as defined in claim 1, wherein the step of forming said peripheral edge of said glass sheet includes the step of forming said peripheral edge to conform to the shape including a leg portion depending downwardly from said peripheral edge.

3. A method as defined in claim 1, wherein the step of forming said peripheral edge of said glass sheet includes the step of forming said peripheral edge to conform to the shape like a bead in round cross section.

4. A method as defined in claim 1, wherein the step of causing the relative rotary motion of said sheet glass and said forming roller means includes the step of causing said sheet glass to turn on its supported axis relative to said forming roller means.

5. A method as defined in claim 1, wherein the step of causing the relative rotary motion of said sheet glass and said forming roller means includes the step of causing said forming roller means to travel around said peripheral edge of said sheet glass.

6. A method as defined in claim 1, wherein the step of forming said sheet glass to provide a curved-surface by heating is performed by using any suitable hot-press shaping means.

* * * * *